(12) United States Patent
Freitag et al.

(10) Patent No.: US 12,073,187 B2
(45) Date of Patent: Aug. 27, 2024

(54) AUTOMATIC EVALUATION OF NATURAL LANGUAGE TEXT GENERATED BASED ON STRUCTURED DATA

(71) Applicant: GOOGLE LLC, Mountain View, CA (US)

(72) Inventors: Markus Freitag, Sunnyvale, CA (US); Howard Scott Roy, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 285 days.

(21) Appl. No.: 17/608,616

(22) PCT Filed: Aug. 22, 2019

(86) PCT No.: PCT/US2019/047719
§ 371 (c)(1),
(2) Date: Nov. 3, 2021

(87) PCT Pub. No.: WO2020/231453
PCT Pub. Date: Nov. 19, 2020

(65) Prior Publication Data
US 2022/0215184 A1    Jul. 7, 2022

Related U.S. Application Data

(60) Provisional application No. 62/847,078, filed on May 13, 2019.

(51) Int. Cl.
*G06F 40/56* (2020.01)
*G06F 40/226* (2020.01)
*G06F 40/30* (2020.01)

(52) U.S. Cl.
CPC ............ *G06F 40/56* (2020.01); *G06F 40/226* (2020.01); *G06F 40/30* (2020.01)

(58) Field of Classification Search
USPC .................................................. 704/7–10, 257
See application file for complete search history.

(56) References Cited

U.S. PATENT DOCUMENTS

| 2014/0207439 | A1* | 7/2014 | Venkatapathy | G06F 40/274 |
| | | | | 704/4 |
| 2015/0032443 | A1* | 1/2015 | Karov | G06F 40/35 |
| | | | | 704/9 |
| 2019/0073997 | A1* | 3/2019 | Millen | G10L 15/16 |
| 2019/0139541 | A1 | 5/2019 | Andersen et al. | |
| 2020/0349224 | A1* | 11/2020 | Kurien | G06F 40/274 |

OTHER PUBLICATIONS

Dusek, O. et al., "Evaluating the State-of-the-Art of End-to-End Natural Language Generation: The E2E NLG Challenge;" Computer Speech & Language, retrieved from internet: https://arxiv.org/pdf/1901.07931v1; pp. 123-156; Jan. 23, 2019.

(Continued)

*Primary Examiner* — Leonard Saint-Cyr
(74) *Attorney, Agent, or Firm* — Gray Ice Higdon

(57) ABSTRACT

Techniques are disclosed for training and/or utilizing an alignments and language model ("ALM") in automatically determining an ALM score corresponding with natural language text generated using a natural language generation model. The natural language text generated using the natural language generation model can be based on a set of structured data. Additionally or alternatively, the ALM can include a fluency model portion and a semantics model portion. The fluency model portion can be used in determining the fluency and/or grammar of the text. The semantics model portion be used in evaluating the content of the natural language text with respect to the content of the structured data.

20 Claims, 10 Drawing Sheets

(56) References Cited

OTHER PUBLICATIONS

Reed, L. et al., "Can Neural Generators for Dialogue Learn Sentence Planning and Discourse Structuring?;" Cornell University; arXiv.org; arXiv:1809.03015v1; 10 pages; dated Sep. 9, 2018.
Reed, L. et al., "Can Neural Generators for Dialogue Learn Sentence Planning and Discourse Structuring?;" Cornell University; arXiv.org; arXiv:1809.03015v2; 12 pages; dated Nov. 1, 2018.
Smiley, C. et al., "The E2E NLG Challenge: A Tale of Two Systems;" Proceedings of the 11th International Conference on Natural Language Generation; pp. 472-477; Nov. 5, 2018.
Belz, A. et al., "Comparing Automatic and Human Evaluation of NLG Systems;" retrieved from internet: https://www.aclweb.org/anthology/E06-1040.pdf; 8 pages; 2006.
European Patent Office; International Search Report and Written Opinion of Ser. No. PCT/US2019/047719; 15 pages; dated Jan. 22, 2020.
Hill, F. et al., "Learning Distributed Representations of Sentences from Unlabelled Data;" arXiv.org, arXiv:1602.03483v1; 11 pages; dated Feb. 10, 2016.
Freitag, M. et al., "Unsupervised Natural Language Generation with Denoising Autoencoders;" arXiv.org; arXiv:1804.07899v2; 8 pages; dated Aug. 24, 2018.
European Patent Office; Communication pursuant to Article 94(3) EPC issued in Application No. 19762658.3; 7 pages; dated Feb. 23, 2023.
European Patent Office; Summons to Attend Oral Proceedings issued for Application No. 19762658.3, 33 pages, dated Feb. 5, 2024.
European Patent Office, Brief Response issued for Application No. 19762658.3, 9 pages, dated Jun. 20, 2024.

\* cited by examiner

| | | | | | | | | |
|---|---|---|---|---|---|---|---|---|
| John | / | x | / | / | / | / | / | / |
| Doe | / | / | x | / | / | / | / | / |
| jr | / | / | / | x | / | / | / | / |
| is | / | / | / | / | / | / | / | / |
| 1.905 | / | / | / | / | / | x | / | / |
| meters | / | / | / | / | / | / | x | / |
| tall | / | / | / | / | / | / | / | x |
| . | / | / | / | / | / | / | / | / |
| | name | John | Doe | , | jr. | height | 1.905 | meter |

FIG. 3

| John | birthDate | 8/26/1942 |
| John | birthPlace | San Antonio |
| John | occupation | fighter pilot |

402 ↘ John, born in San Antonio on 1942-08-26, worked as a fighter pilot

404 ↘ John, a fighter pilot, was born on August 26$^{th}$ 1942 in San Antonio

FIG. 4B

| name | type | food | family friendly |
|---|---|---|---|
| Hypothetical Café | resturant | Indian | yes |

There is an Indian restaurant that is kids friendly. It is Hypothetical Café. ← 502

Hypothetical Café is a well-received restaurant with a wide range of delicious Indian food. It also delivers a fantastic service to young children. ← 504

Hypothetical Café is a family friendly restaurant providing Indian food. ← 506

FIG. 5B

AUTOMATIC EVALUATION OF NATURAL LANGUAGE TEXT GENERATED BASED ON STRUCTURED DATA

BACKGROUND

Natural language processing involves interactions between computing devices and human languages (i.e., natural languages). A wide variety of natural language problems exist including speech recognition, natural language understanding, natural language generation, etc. Natural language generation models can be used to process structured data using one or more computing devices to generate text, speech, etc. For example, a natural language generation system can generate the natural language text of "Five lights are currently turned on in your kitchen" by processing the set of structured data "number of lights=5; room=kitchen" using a natural language generation model. Natural language generation models can use machine learning model(s) (such as artificial neural network(s)) to predict the likelihood of a sequence of words given a set of structured data.

SUMMARY

Implementations described herein are directed towards automatically evaluating natural language text using an alignments and language model ("ALM"), where the natural language text is generated by processing structured data using a natural language generation model. In some implementations, one or more instances of natural language text can be generated based on the same set of structured data, utilizing one or more natural language generation model(s). For example, "The thermostat is set to 72 degrees. It is 91 degrees right now in Louisville."; "The exterior temperature in Louisville is 91 degrees and your thermostat is set to 72 degrees"; and/or additional instances of text can each be generated based on a set of structured data of "thermostat temperature—72; location—Louisville; external temperature—91". One of the generated instances of natural language text can be selected based on its ALM score that is generated utilizing the ALM, and the selected instance visually rendered and/or corresponding synthesized speech generated and rendered. As described herein, the generated ALM score can be based on both a fluency score and a semantics score, and selecting the instance based on the ALM score can ensure the selected instance conveys underlying semantics of the structured data with language and phrasing that resonates with a receiving user. This can make the overall duration of an interaction shorter than it would otherwise need to be, thereby saving computational load.

ALM processes can evaluate generated text by processing the text using an ALM to generate an ALM score. This score can be used to compare the natural language generation model used in generating the text with additional and/or alternative natural language generation model(s). For example, a first instance of text can be generated by processing a set of structured data using a first natural language generation model. A second instance of text can be generated by processing the same set of structured data using a second natural language generation model. The first instance of text can be processed using the ALM to generate a first ALM score. Similarly, the second instance of text can be processed using the same ALM to generate a second ALM score. In many implementations, the first and second ALM scores can be utilized to evaluate the first natural language generation model and/or the second natural language generation model.

For example, a client device can include multiple natural language generation models. Text generated using each model can be processed with the ALM to generate corresponding ALM scores. In a variety of implementations, the ALM scores can be utilized to select text such as selecting the text with the corresponding ALM score that is most indicative of fluency and semantics, which can be the text with the highest corresponding ALM score or the text with the lowest corresponding ALM score (depending on the implementation and whether a higher score indicates greater fluency and semantics), selecting instances of text with an ALM score above a threshold value, etc. In many implementations, one or more actions of a client device can be performed based on the selected text. For example, the action(s) can include generating an audio waveform based on the selected text (e.g., using a text-to-speech model); rendering audio (via speaker(s)) based on the generated audio waveform; rendering the selected text on a display; causing a networked device to perform one or more actions based on the selected text; and/or performing other action(s).

Generated text evaluation can be divided into a variety of evaluation sub-tasks. In many implementations, ALM processes can be divided into at least two evaluation sub-tasks: (1) fluency evaluation and (2) semantics evaluation. Fluency evaluation can assess the fluency (i.e., an indication of the likelihood a human will perceive the text as natural) and/or the grammar (i.e., an indication of the likelihood that the text is grammatically correct) of natural language text. Additionally or alternatively, semantics evaluation can assess the content of the text with respect to the structured data utilized in generating the text (i.e., penalizing content included in the structured data and missing from the text; penalizing content included in the structured data and repeated in the text; penalizing additional content included in the text that is not included in the structured data, etc.).

Fluency can be evaluated by processing the generated natural language text using a fluency model portion of the ALM to generate a fluency score. In many implementations, the fluency score is independent of the structured data used in generating the text. The fluency model portion of the ALM can be represented by a statistical language model such as an n-gram language model which is used as an approximation of the underlying language. This n-gram language model can be trained based on unlabeled data.

Semantics can be evaluated by processing the generated natural language text as well as the structured data used in generating the text using a semantics model portion of the ALM. A first probability indicating the likelihood the generated text was generated using the structured data can be determined to check if all information in the structured data is present in the text. Similarly, a second probability can be determined indicating the likelihood the structured data was used in generating the text, which can provide an indication if all information in the generated text can be aligned to feature(s) in the structured data. A semantics score can be determined based on these two probabilities.

In many implementations, the ALM score can be determined based on both the fluency score and based on the semantics score. For example, the ALM score can be determined using the average and/or other combination of the fluency score and the semantics score. In many implementations, natural language generation task specific weights can be utilized in determining the ALM score. In other words, semantics can be more important to some natural language generation tasks and/or fluency can be more important to other natural language generation tasks.

Thus, the semantics score and the fluency score can be weighted differently, in generating the ALM score, in dependence on the natural language generation task for which an instance of natural language text (being evaluated) is generated. For example, if the natural language generation task is to generate natural language text from structured data that specifies router settings for configuring a router, the semantics score can be weighted more heavily than the fluency score to ensure structured data is included in the instance of natural language text—which can be critical to ensure proper configuration of the router. As another example, if the natural language generation task is instead to generate natural language text from structured data that reflects details of a restaurant (e.g., cuisine type, cost, review(s)), then the fluency score can be weighted more heavily to ensure the natural language text conveys the details using language and phrasing which resonates with a user. This can make the overall duration of interaction with the user shorter, by preventing clarifying follow-up prompts by the user (as a result of the resonating natural language text), thereby saving computational load in a computing system hosting an automated assistant and/or other application(s) rendering the natural language text (and/or corresponding generated audio data). In these and other manners, fluency and semantic scores can be dynamically weighted, in dependence on the natural language generation task, to ensure important structured data is conveyed in natural language text for certain natural language generation tasks, while promoting shorter duration of interactions for certain other natural language generation tasks.

Accordingly, various implementations set forth techniques for automatically evaluating natural language generation models and/or text generated using natural language generation model processes using an alignments and language model. Evaluating natural language generation model(s) in a fully supervised manner can be resource and/or labor intensive. For example, a natural language generation model can be evaluated by evaluating instances of text generated using the model. In evaluating a single instance of text, relevant data (e.g., text generated using the natural language generation model, structured data used in generating the text, etc.) must be transmitted to a client device of a human reviewer, resources of the client device utilized to enable the reviewer to provide an annotation, and the annotation transmitted back for evaluation. Implementations disclosed herein utilize automatically generating an ALM score, enabling systems to quickly evaluate a wide number natural language generation models—without transmission of data to client devices of reviewers and without utilization of resources of those client devices in obtaining reviewer provided annotations. Additionally or alternatively, different human reviewers can score the same instance on natural language text differently. ALM scores generated by processing natural language text using an ALM can provide a uniform scoring system, thus enabling a reproducible comparison of natural language generation models. For example, a current version of a natural language generation model can be compared with a previous version of the natural language generation model by comparing automatically generated ALM score(s).

As described herein, a client device can perform action(s) based on text selected based on the ALM score for the text. For example, multiple natural language generation models can be utilized in generating candidate text based on the same set of structured data. An instance of text can be selected from the candidate text based on the selected text's ALM score. In many implementations, the selected text can be visually and/or audibly rendered. Since the selected text has high fluency and/or semantics, it is more quickly ascertainable by a user to which it is rendered. This can prevent the user from needing to request the text again, wasting computational resources, and/or can enable the user to more quickly provide further user interface input that is responsive to the selected text, reducing computer/user interaction duration and conserving computational resources.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates an example alignment between structured data and natural language text generated based on the structured data in accordance with various implementations disclosed herein.

FIGS. 4A and 4B illustrate a set of structured data and natural language text generated based on the set of structured data in accordance with various implementations disclosed herein.

FIGS. 5A and 5B illustrate another set of structured data and natural language text generated based on the set of structured data in accordance with various implementations disclosed herein.

DETAILED DESCRIPTION

Figure 1:
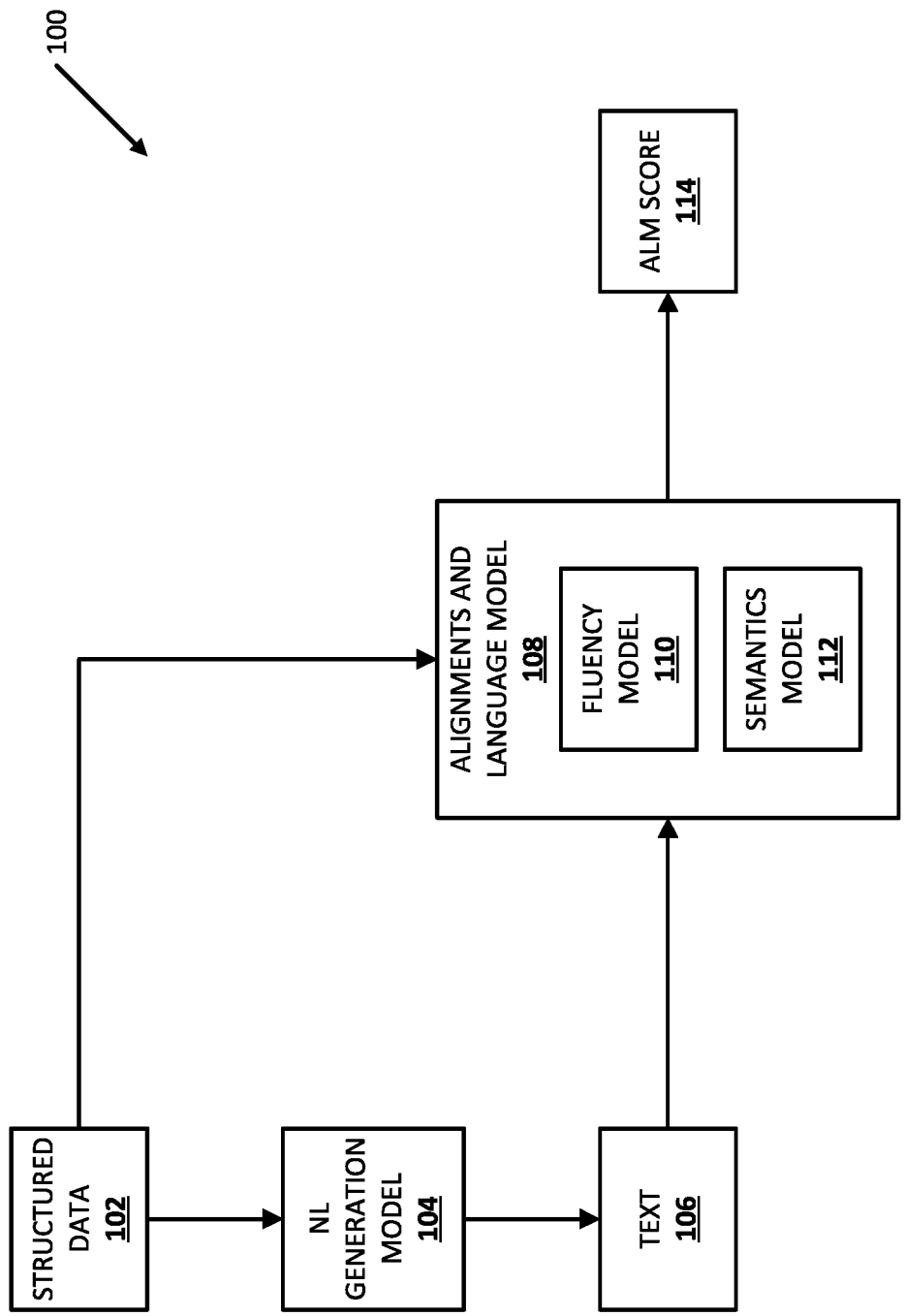
FIG. 1 illustrates an example of determining an alignments and language score for an instance of natural language text in accordance with various implementations disclosed herein.

Evaluation is a crucial component of natural language processing. Without evaluation, it can be impossible to measure quality. One way to evaluate a natural language processing process is to recruit human subjects and ask them to assess system output along with some predetermined criteria. However, human evaluation is expensive and time-consuming. For developers who may need to rapidly test multiple system configurations, the time factor is a significant barrier. Due to these reasons, there is a huge demand to develop methods of evaluation that can automatically provide results that are proxies for human judgement.

Implementations disclosed herein utilize an automatic metric that yields high correlation with human ratings on data-to-text generations. The data-to-text task can be formulated as generating a natural language output conditioned on a table T (i.e., structured data). The table T consists of several field-value records and the natural language output should include all of the information present in the table. ALM evaluation can include two core ideas: metrics for different evaluation subtasks and reproducibility/simplicity.

Evaluation subtasks can include a fluency evaluation subtask as well as a semantics evaluation subtask. The evaluation sub-tasks can be evaluated separately utilizing different models. This has several advantages: First, evaluation models can be defined that concentrate on the subtask problems. For example, fluency evaluation does not need to evaluate the content and can be rated without having access to the table information. Semantics evaluation, on the other hand, can concentrate on content words. Further, task-specific weights can be assigned to the importance of the subtasks. For example, a much higher weight can be placed on semantic correctness.

Additionally or alternatively, ALM evaluation is reproducible and simple. Different alignments and language model implementations will yield the same ALM score when running with the same tokenization and normalization. This makes it possible to compare scores between different groups and approaches. Further, ALM scores are easy to understand. In a variety of implementations, neural network models are avoided due to the challenge in interpreting the models as well as different neural network models not yielding the same ALM scores when trained by different groups. Additionally or alternatively, only natural language task specific data is utilized in training and/or evaluating ALMs to increase the reproducibility of the model as well as improve the model for domain specific words and phrases.

In a variety of implementations, there is no need to process the table information (i.e., the structure data) to evaluate the fluency of natural language text generated based on the table information. In other words, fluency evaluation subtask is independent of the actual content of the text. In many implementations, fluency can be evaluated using a statistical language model such as an n-gram language model where each word depends only on the last n−1 words. This Markov model can be utilized as an approximation of the actual underlying language:

$$P(t_1, \ldots, t_M) = \prod_{t=1}^{M} P(t_i | t_{i-(n-1)}, \ldots, t_{i-1})$$

In many implementations, using an n-gram language model instead of, for example, a neural-network based language model increases the reproducibility of the fluency model as retraining the statistical language model on the same data yields the same probabilities. In some implementations, the fluency score of the sequence $t_1, \ldots, t_M$ is normalized by the number of words M in the sequence. Resulting in the following equation:

$$\text{fluency}(t_1, \ldots t_M) = \frac{P(t_1, \ldots, t_M)}{M}$$

In a variety of implementations, the statistical language model (i.e., the fluency model portion of the ALM) can be trained on a massive amount of unlabeled data in a reproducible way. However, natural language task-specific terms can be infrequent in other domains which results in language model scores that would penalize them. Therefore, in some implementations, the fluency model can be trained using natural language generation task specific training data. Furthermore, in various implementations, the fluency model portion can be trained using subword units to overcome the problem of out-of-vocabulary words.

In many implementations, semantics evaluation can include comparing the text generated using the natural language generation model with the structured data used in generating the text (in contrast to comparing the generated text with an instance of "golden reference" text generated using the same set of structured data). The generated output (i.e., the generated text) can be aligned with the input representation (i.e., the structured data). In many implementations, it can be assumed that when a semantics model only aligns a few words of an input/output pair, it is very likely that they are semantically different. In many implementations, the alignment process of the semantics model is based on the IBM-1 model from machine translation. For an flatten input representation $s=s_1, \ldots, s_N$ of length N and a target sequence $t=t_1, t_M$ of length M and lexical probabilities $pr(s_i, t_j)$, the conditional probability $p(s|t)$ of t being generated by s with can be determined by:

$$p(t) = \prod_{i=1}^{N} \max_{1 \leq j \leq M} pr(s_i, t_j)$$

Additionally or alternatively, a NULL word can be utilized to account for words that likely have no counterpart, such as a null word on the target side. In many implementations, word(s) without a proper target translation are aligned to that NULL word.

In many implementations, lexical probabilities can be trained using the natural language generation task specific training data utilized in training the fluency model portion. For example, the open source toolkit fastAlign can be utilized for alignment calculation(s) where the precision parameter is set to $\lambda=0$.

In a variety of implementations, both the alignments scores $p(s|t)$ and $p(t|s)$ can be determined in semantics evaluation. First, the probability if the generated text (i.e., the text generated using the natural language generation model) has been produced by the table (i.e., the structured data) with $p(t|s)$ to check if all information of the table is present in the text. Second, probability $p(s|t)$ can be determined to check if all information of the target sequence can be aligned to some table features. In a variety of implementations, the fluency score is determined as the average of the alignment scores in both directions by:

$$\text{sem}(s,t) = \tfrac{1}{2} p(t) + \tfrac{1}{2} p(s)$$

Additionally or alternatively, for some natural language generation tasks, the semantics score can be determined based on the only $p(s|t)$ or $p(t|s)$.

An ALM score in accordance with many implementations is based on a combination of the semantics score and the fluency score. For example:

$$\text{ALM}(s,t) = 100(\tfrac{1}{2}\text{sem}(s,t) + \tfrac{1}{2} + \text{fluency}(t))$$

Additionally or alternatively, the ALM score can be determined based on natural language generation task specific weights. For example, for some tasks semantics can be more important than fluency or fluency can be more important than semantics.

FIG. 1 illustrates an example of determining an ALM score by processing text and a corresponding set of structured data using an ALM model. In the illustrated example 100, structured data 102 is processed using natural language generation model 104 to generate text 106. For example, the set of structured data 400 illustrated in FIG. 4A indicating the birth date, birthplace, and occupation of John (birth date—Aug. 26, 1942; birthplace—San Antonio; occupation—fighter pilot) can be processed using natural language generation model 104 to generate the instance of text 402 illustrated in FIG. 4B of "John, born in San Antonio on 1942 Aug. 26, worked as a fighter pilot". Additionally or alternatively, set of structured data 400 of FIG. 4A can be processed using an additional or alternative natural language generation model 104 to generate the instance of text 402 illustrated in FIG. 4B of "John, a fighter pilot, was born on Aug. 26, 1942 in San Antonio". As a further example, the set of structured data 500 illustrated in FIG. 5A describing Hypothetical Café of "name—Hypothetical Caf—; type—restaurant; food—Indian; family friendly—yes" can be processed by natural language generation model 102 to generate text 502 of "There is an Indian restaurant that is kids friendly. It is Hypothetical Café."; to generate text 504 of "Hypothetical Café is a well-received restaurant with a wide range of delicious Indian food. It also delivers fantastic service to young children"; to generate text 506 of "Hypothetical Café is a family friendly restaurant providing Indian food"; and/or additional text generated based on structured data 500.

Text 106 and structured data 102 can be processed using alignments and language model 108 to determine ALM score 114. In many implementations, alignments and language model 108 can include a fluency model portion 110 and a semantics model portion 112. Fluency model portion 110 can be utilized to determine a fluency score by processing text 106. In many implementations, the fluency score provides an indication of the fluency and/or the grammar of text 106 and can be independent of the content of the text. Additionally or alternatively, semantics model portion 112 can be utilized to determine a semantics score by processing structured data 102 as well as text 106. In a variety of implementations, the semantics score can provide an evaluation of the content of text 106 by aligning the text with feature(s) in the structured data. In a variety of implementations, the fluency score and the semantics score can be used to determine ALM score 114.

Figure 2:
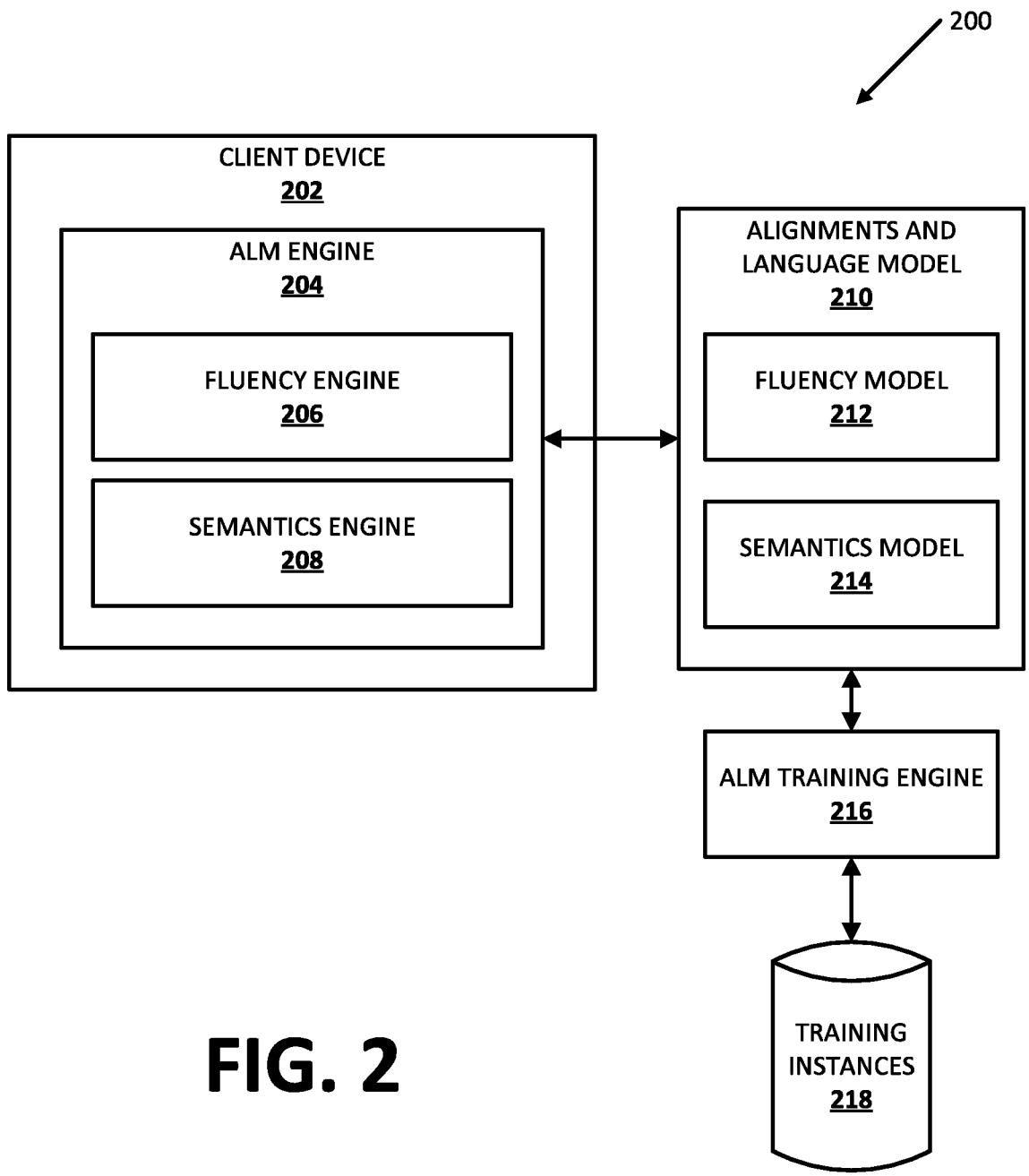
FIG. 2 illustrates an example environment in which implementations disclosed herein can be implemented.

FIG. 2 illustrates an example environment in which implementations disclosed herein may be implemented. The example environment 200 if FIG. 2 includes client device 202, ALM engine 204, fluency engine 206, semantics engine 208, alignments and language model 210, fluency model 212, semantics model 214, ALM training engine 216, training instances 218, and/or additional engine(s) and/or model(s) (not depicted). The client device 202 may be, for example, a standalone voice-activated speaker device, a desktop computing device, a laptop computing device, a tablet computing device, a mobile phone computing device, a computing device in the vehicle of the user (e.g., an in-vehicle communications system, an in-vehicle entertainment system, an in-vehicle navigation system), and/or a wearable apparatus of the user that includes a computing device (e.g., a watch having a computing device, glasses having a computing device, a virtual or augmented reality computing device, etc.). Additional and/or alternative client devices may be provided.

ALM engine 204, fluency engine 206, semantics engine 208, and ALM training engine 216 are example components in which techniques described herein may interface. The operations performed by one or more engines 204, 206, 208, 216 of FIG. 2 may be distributed across multiple computing systems. In some implementations, one or more aspects of engines 204, 206, 208, 216 may be combined in a single system and/or one or more aspects may be implemented on the client device 202. For example, in some of those implementations, aspects of ALM engine 204 may be combined with aspects of ALM training engine 216. Engines in accordance with many implementations may each be implemented in one or more computing devices that communicate, for example, through a communications network. A communications network may include a wide area network such as the Internet, one or more local area networks ("LAN"s) such as Wi-Fi LANs, mesh networks, etc., and/or one or more bus subsystems. A communication network may optionally utilize one or more standard communication technologies, protocols, and/or inter-process communication techniques.

ALM engine 204 includes fluency engine 206, semantics engine 208, and/or additional engine(s) (not depicted). In several implementations, ALM engine 204 can process structured data and or text generated based on the structured data (e.g., the text can be generated by processing the structured data using a natural language generation model) using alignments and language model 210 to generate an ALM score. ALM 210 can include a fluency model portion 212 as well as a semantics model portion 214. In many implementations, fluency engine 206 can be process generated text using fluency model portion 212 to generate a fluency score. Additionally or alternatively, semantics engine 208 can process generated text as well as structured data utilized in generating the text using semantics model portion 214 to generate a semantics score. ALM engine 204 can determine an ALM score based on the fluency score and the semantics score.

In a variety of implementations, client device 202, utilizing ALM training engine 216, can train ALM 210 including the fluency model portion 212 and/or the semantics model portion 214 using training instances 218. In a variety of implementations, training instances 218 include unlabeled data. Utilizing training instances to train ALM 210 is described with respect to process 600 of FIG. 6.

Figure 3:
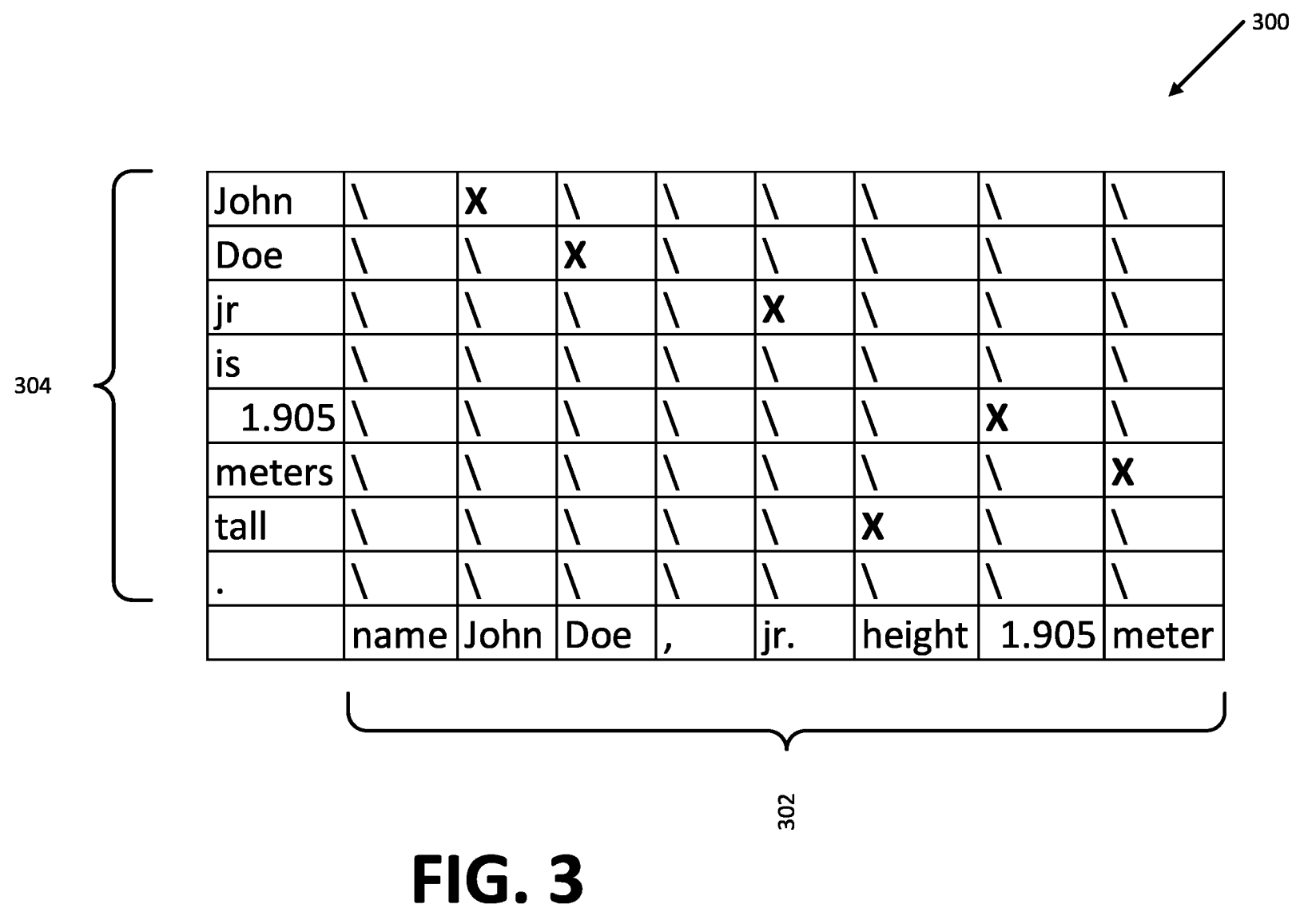

FIG. 3 illustrates an example alignment in accordance with implementations disclosed herein. Alignment 300 illustrates a mapping between structured data 302 of "name John Doe, jr. height 1905 meter" and generated text 304 of "John Doe jr is 1905 meters tall.". In the illustrated example, an 'X' indicates a feature in the structured data corresponds with a feature in the generated text. Similarly, '/' indicates a feature in the structured data is not aligned with a feature in the generated text. For example, 'John' aligns with 'John', 'Doe' aligns with 'Doe', 'jr' aligns with 'jr.', '1.905' aligns with '1.905', 'meters' aligns with 'meter', and 'tall' aligns with 'height'. One or more features of generated text 304 do not align with feature(s) in structured data 302 including 'is' and '.'. In many implementations, portions of the generated text that do not align with the structured data can be aligned to 'NULL'. Additionally or alternatively, one or more features of structured data 302 are not aligned with any portion of generated text 304 including 'name' and ','. In some implementations, portion(s) of structured data which do not align with portion(s) of generated text can be additionally or alternatively be aligned to 'NULL'.

Figure 6:
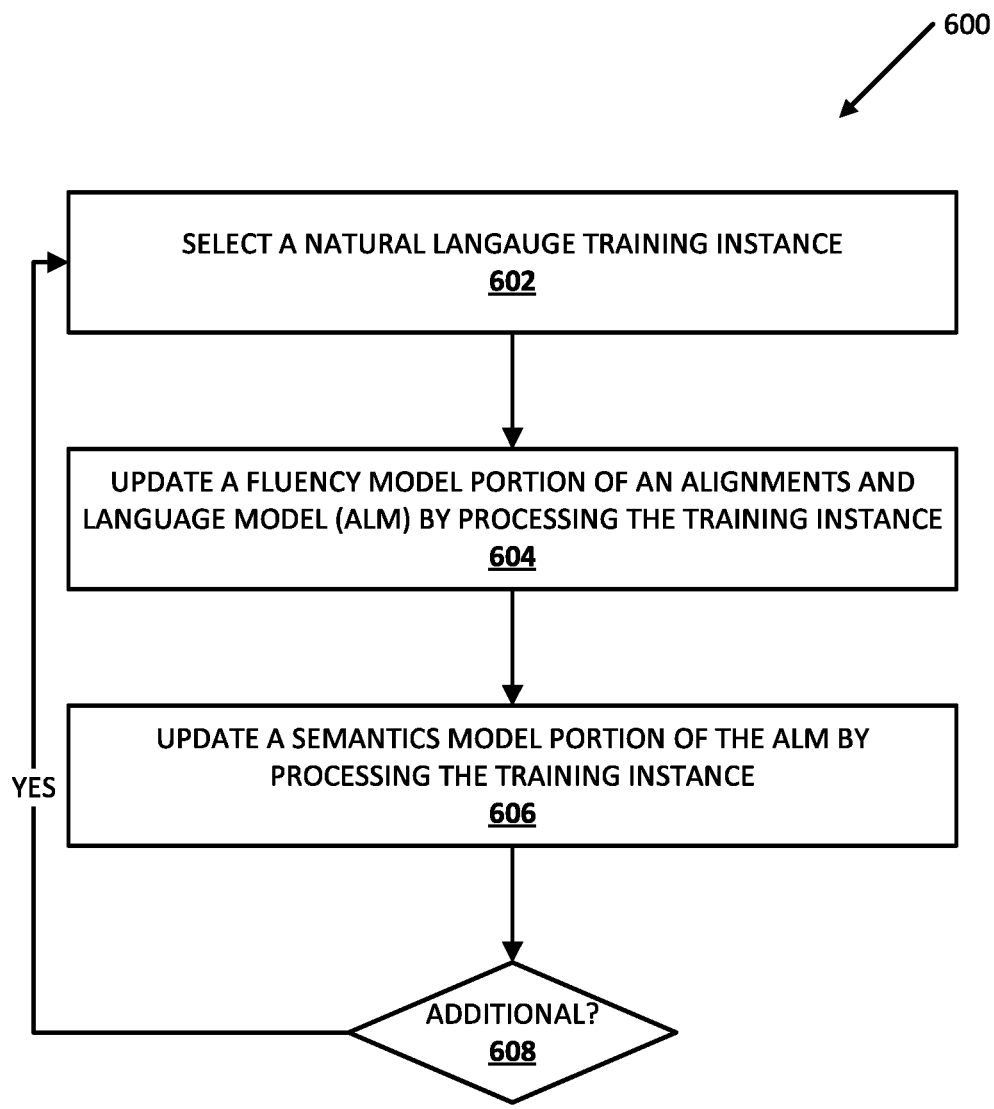
FIG. 6 is a flowchart illustrating an example process in accordance with implementations disclosed herein.

FIG. 6 is a flowchart illustrating a process 600 of training an alignments and language model according to implementations disclosed herein. For convenience, the operations of the flowchart are described with reference to a system that performs operations. This system may include various components of various computer systems, such as one or more components of client device 202 of FIG. 2. Moreover, while operations of process 600 are shown in a particular order, this is not meant to be limiting. One or more operations may be reordered, omitted, and/or added.

At block 602, the system selects a natural language training instance. In many implementations, the natural language training instance is an unlabeled instance of text. For example, an ALM can be trained for use in generating ALM scores for instances of natural language text including a recommendation of a restaurant based on structured data corresponding with the restaurant. An unlabeled training instance can include sentence(s) describing a restaurant, without additional indication(s) describing the instance of text. Additionally or alternatively, the natural language training instance can include a structured data portion, where the text is based on the structured data.

At block 604, the system updates a fluency model portion of the ALM by processing the training instance. For example, the system can process the natural language text to train a statistical language model such as an n-gram language mode such that the statistical language model provides an approximation of the underlying language.

At block 606, the system updates a semantics model portion of the ALM by processing the training instance. For example, the system can process the instance of text as well as a corresponding instance of structured data, and update the semantics model based on the processing.

At block 608, the system determines whether to process additional training instance(s). If so, the system proceeds back to block 602, selects an additional unlabeled natural language training instance before proceeding to blocks 604 and 606. If the system does not determine to process any additional training instances, the process ends.

Figure 7:
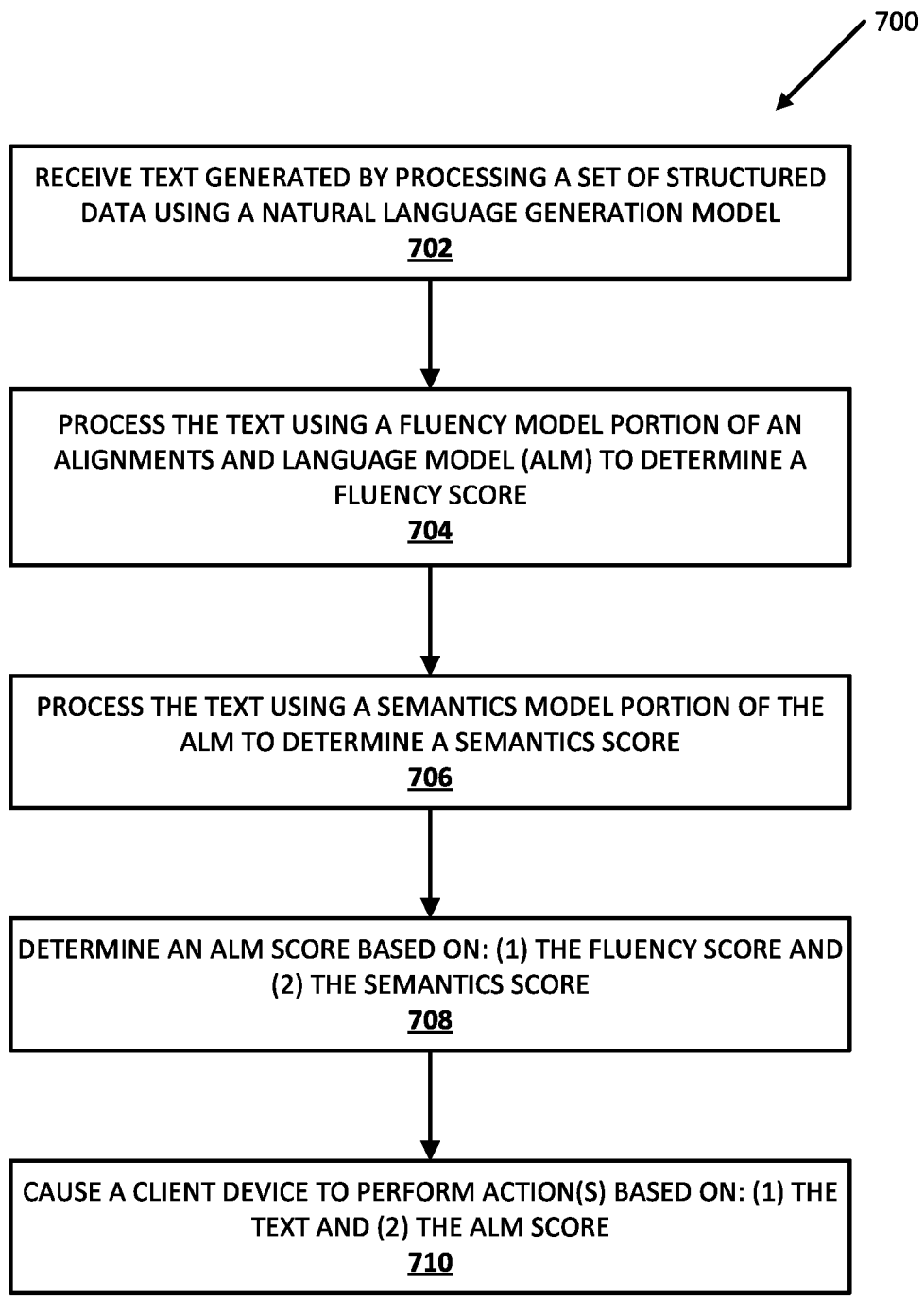
FIG. 7 is a flowchart illustrating another example process in accordance with implementations disclosed herein.

FIG. 7 is a flowchart illustrating a process 700 of generating an ALM score using an ALM according to implementations disclosed herein. For convenience, the operations of the flowchart are described with reference to a system that performs operations. This system may include various components of various computer systems, such as one or more components of client device 202 of FIG. 2. Moreover, while operations of process 700 are shown in a particular order, this is not meant to be limiting. One or more operations may be reordered, omitted, and/or added.

At block 702, the system receives text generated by processing a set of structured data using a natural language generation model. For example, the system can receive instance of text 402 illustrated in FIG. 4B of "John, born in San Antonio of 1942 Aug. 26, worked as a fighter pilot" based on structured data 400 illustrated in FIG. 4A describing John's birth date (Aug. 26, 1942), birthplace (San Antonio), and occupation (fighter pilot).

At block 704, the system processes the generated text using a fluency model portion of an ALM to determine a fluency score. For example, the generated text of "John, born in San Antonio of 1942 Aug. 26, worked as a fighter pilot" can be processed using the fluency model portion of the ALM to determine a fluency score. In some implementations, the fluency score of the sequence $t_1, \ldots, t_M$ is normalized by the number of words M in the sequence. The fluency score can be determined by:

$$\text{fluency}(t_1, \ldots t_M) = \frac{P(t_1, \ldots, t_M)}{M}$$

At block 706, the system processes the generated text using a semantics model portion of the ALM to determine a semantics score. In many implementations, the system can additionally process the corresponding set of structured data in addition to the generated text to determine the semantics score. In a variety of implementations, both the alignments scores p(s|t) and p(t|s) can be determined in semantics evaluation. First, the probability if the generated text (i.e., the text generated using the natural language generation model) has been produced by the table (i.e., the structured data) with p(t|s) to check if all information of the table is present in the text. Second, probability p(s|t) can be determined to check if all information of the target sequence can be aligned to some table features. In a variety of implementations, the fluency score is determined as the average of the alignment scores in both directions by:

$$\text{sem}(s,t) = \tfrac{1}{2} p(t) + \tfrac{1}{2} p(s)$$

Additionally or alternatively, for some natural language generation tasks, the semantics score can be determined based on the only p(s|t) or p(t|s).

At block 708, the system determines an ALM score based on the fluency score determined at block 704 and based on the semantics score determined at block 706. For example, the ALM score can be determined by giving the semantics score and the fluency score equal weights in the ALM score:

$$\text{ALM}(s,t) = 100(\tfrac{1}{2}\text{sem}(s,t) + \tfrac{1}{2}\text{fluency}(t))$$

While the fluency score and the semantics score are weighted equally in the illustrated example, the semantics score and fluency score can be weighted such that the fluency score or the semantics score has a greater weight on the ALM score (e.g., the fluency score is weighted by 0.75 and the semantics score is weighted by 0.25; the fluency score is weighted by 0.25 and the semantics score is weighted by 0.75; the fluency score is weighted by 0.49 and the semantics score is weighted by 0.51; and fluency score and the semantics scores are weighted by additional and/or alternative values).

At block 710, the system causes a client device to perform one or more actions based on the generated text and the ALM score. In many implementations, the system can determine whether the ALM score satisfies a threshold value, and if so, can render output based on the generated text. For example, a system can determine an ALM score of 90 for the generated text of "It is 75 degrees and sunny here today in Mountain View". The system can determine whether the ALM score satisfies a threshold value of 85. In response to determining the ALM score of 90 satisfies the threshold value of 85, the system determine an audio waveform based on the generated text and cause the client device to render the audio waveform. Additionally or alternatively, the system can visually render the generated text via a display of the client device. Additional and/or alternative determinations can be made whether to cause the client device to render output based on the generated text. For example, the system can determine whether to render output based on text with a corresponding ALM score of 25 which satisfies a threshold value of 20, to not render output based on text with a corresponding ALM score of 25 which does not satisfy a threshold value of 75, to render output based on three instances of text, each instance of text with a corresponding ALM score of 25 which satisfies a threshold value of 30, and/or to perform action(s) for an instance of text with an additional and/or alternative ALM score(s).

Figure 8:
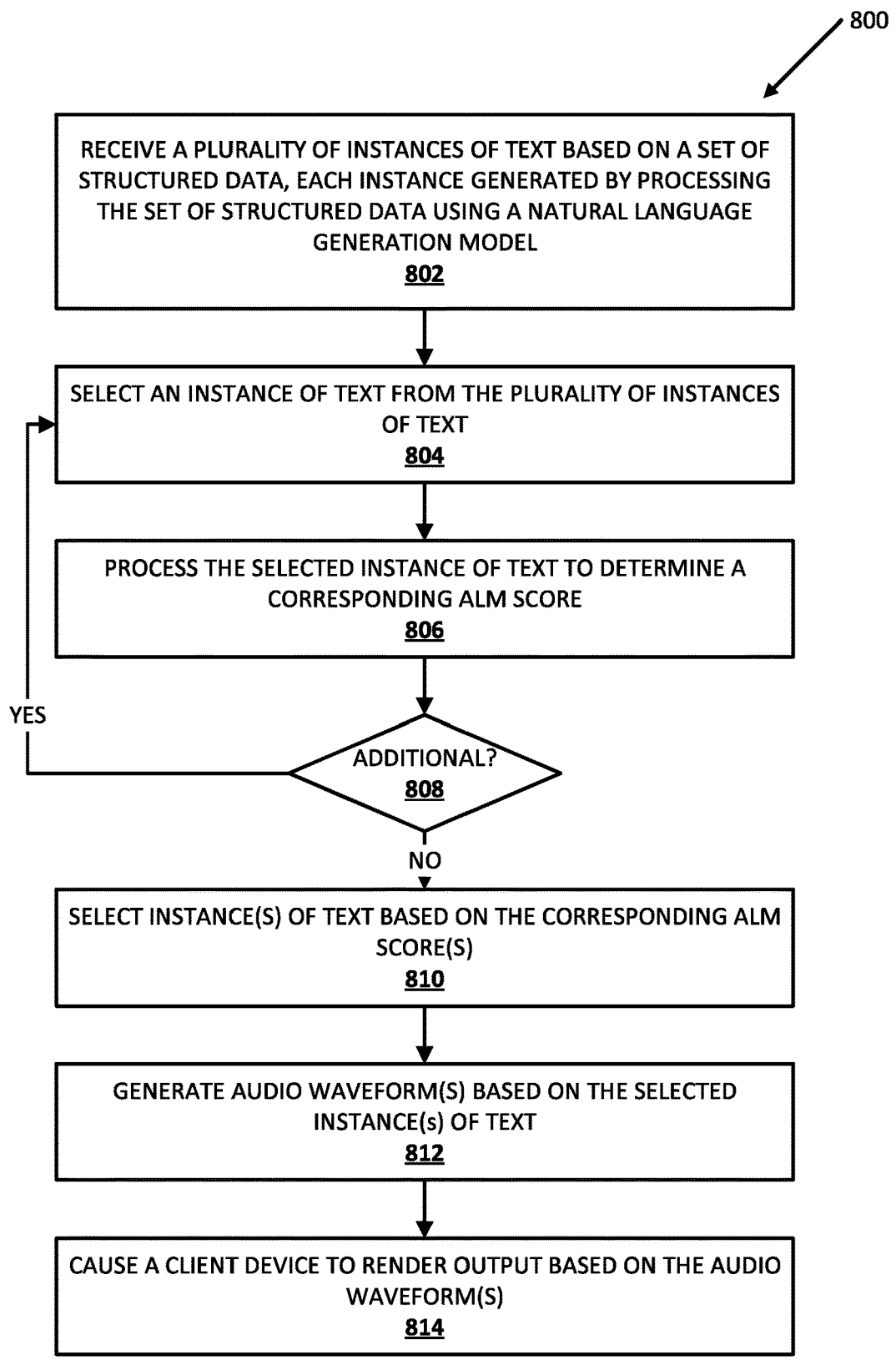
FIG. 8 is a flowchart illustrating another example process in accordance with implementations disclosed herein.

FIG. 8 is a flowchart illustrating a process 800 of determining an ALM score for multiple instances of text and selecting one or more instances of text based on the determined ALM score according to implementations disclosed herein. For convenience, the operations of the flowchart are described with reference to a system that performs operations. This system may include various components of various computer systems, such as one or more components of client device 202 of FIG. 2. Moreover, while operations of process 800 are shown in a particular order, this is not meant to be limiting. One or more operations may be reordered, omitted, and/or added.

At block 802, the system receives a plurality of instances of text based on a set of structured data, each instance generated by processing the set of structured data using a natural language generation model. In some implementations, the instances of text can be generated by processing the set of structured data using the same natural language generation model. For example, the system can process the set of structured data multiple times using a natural language generation model to generate multiple instances of text based on the set of structure data. Additionally or alternatively, the system can process the set of structured data using many distinct natural language generation models, each model being used in generating a distinct instance of generated text. Furthermore, instances of text can be generated using many natural language generation models, where some instances of text are generated using the same natural language generation model and other instances of text are generated using distinct natural language generation models based on the same set of structured data. For example, the system can process a set of structured data using a first natural language generation model to generate instance of text A, the set of structured data using the first natural language generation model to generate instance of text B, the set of structured data using a second natural language generation model to generate instance of text C, the set of structured data using the second natural language generation model to generate instance of text D, and a third natural language generation model to generate instance of text E, where instance of text A, B, C, D, and E are distinct instances of text.

At block 804, the system selects an instance of text from the plurality of instances of text received at block 802.

At block 806, the system processes the selected instance of text to determine a corresponding ALM score. For example, the system can determine a fluency score as well as a semantics score corresponding to the selected instance of text. Additionally or alternatively, the system can determine an ALM score based on the determined fluency score and semantics score. Determining an ALM score corresponding with an instance of text is described with respect to process 700 of FIG. 7.

At block 808, the system determines whether any additional instance(s) of text in the plurality of instances of text are unscored. If so, the system proceeds back to block 804, selects an additional unscored instance of text before proceeding to block 806 to determine an ALM score based on the additional instance of text. If the system determines all instances of text in the plurality of instances of text have been scored, the system proceeds to block 810.

At block 810, the system selects one or more instances of text based on the corresponding ALM score. In many implementations, the system can select instance(s) of text satisfying one or more criteria. For example, the system can select the instance of text with the highest ALM score, the instance of text with the lowest ALM score, the instance(s) of text satisfies a threshold value and/or instance(s) of text with a corresponding ALM score satisfying additional and/or alternative criteria.

At block 812, the system generates one or more audio waveforms based on the one or more instances of text selected at block 810.

At block 814, the system causes a client device to render output based on the audio waveform.

Although process 800 of FIG. 8 is described with respect to rendering audio waveform(s) based on generated text, the system can perform additional and/or alternative actions based on the selected instance(s) of text including causing a client device to render output based on the selected instance(s) of text via a display, causing a networked device to perform one or more actions based on the selected instance(s) of text, etc.

Figure 9:
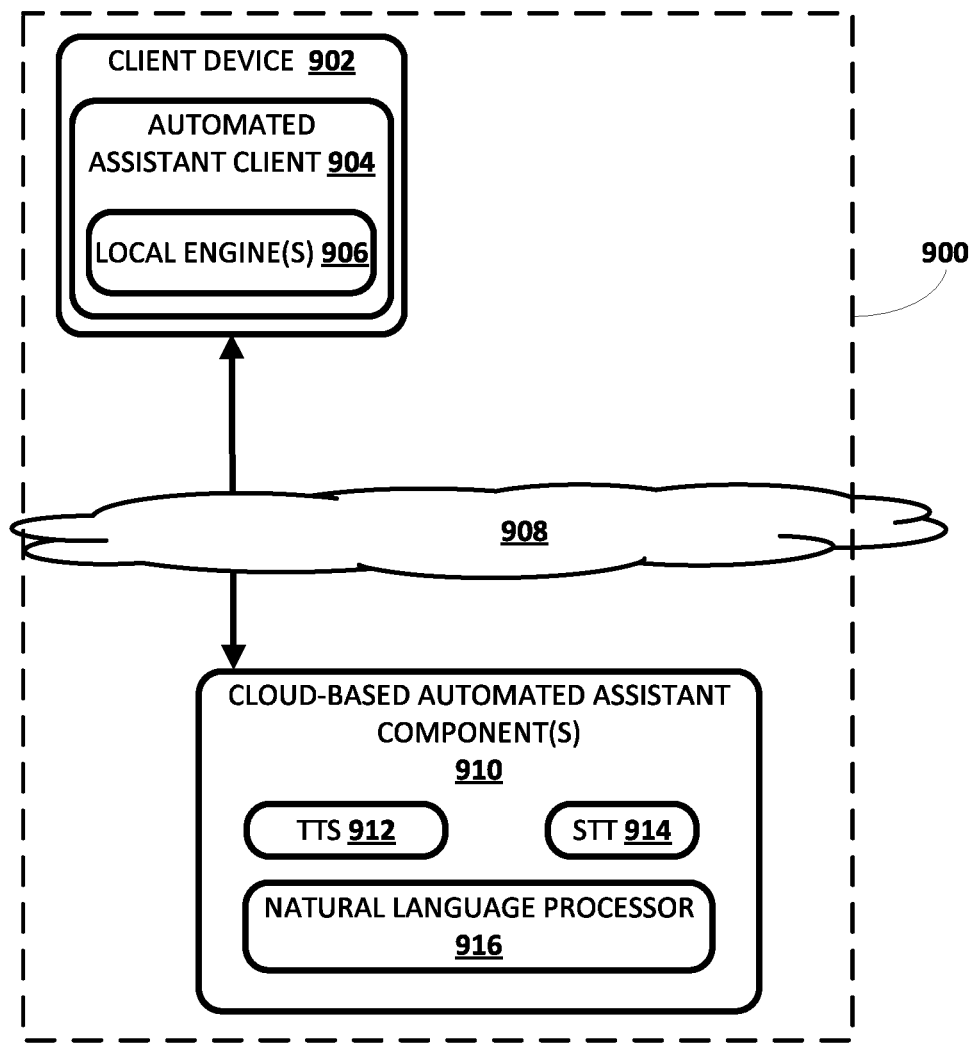
FIG. 9 illustrates another example environment in which implementations disclosed herein can be implemented.

Turning to FIG. 9, an example environment in which implementations disclosed herein can be implemented. FIG. 9 includes a client computing device 902, which executes an instance of an automated assistant client 904. One or more cloud-based automated assistant components 910 can be implemented on one or more computing systems (collectively referred to as a "cloud" computing system) that are communicatively coupled to client device 902 via one or more local and/or wide area networks (e.g., the Internet) indicated generally at 908.

An instance of an automated assistant client 904, by way of its interactions with one or more cloud-based automated assistant components 910, may form what appears to be, from the user's perspective, a logical instance of an automated assistant 900 with which the user may engage in a human-to-computer dialog. It thus should be understood that in some implementations, a user that engages with an automated assistant client 904 executing on client device 902 may, in effect, engage with his or her own logical instance of an automated assistant 900. For the sakes of brevity and simplicity, the term "automated assistant" as used herein as "serving" a particular user will often refer to the combination of an automated assistant client 904 executing on a client device 902 operated by the user and one or more cloud-based automated assistant components 910 (which may be shared amongst multiple automated assistant clients of multiple client computing devices). It should also be understood that in some implementations, automated assistant 900 may respond to a request from any user regardless of whether the user is actually "served" by that particular instance of automated assistant 900.

The client computing device 902 may be, for example: a desktop computing device, a laptop computing device, a tablet computing device, a mobile smartphone computing device, a standalone interactive speaker, a smart appliance, and/or a wearable apparatus of the user that includes a computing device (e.g., a watch of the user having a computing device, glasses of the user having a computing device, a virtual or augmented reality computing device). Additional and/or alternative client computing devices may be provided. Additionally or alternatively, operations of client computing device 902 may be distributed between multiple computing devices. For example, one or more operations of client computing device 902 may be distributed between a mobile smartphone and a vehicle computing device. Furthermore, operations of client computing device 902 may be repeated between multiple computing devices (which in some cases may be communicatively coupled). As a further example, a mobile smartphone as well as a vehicle interface device may each implement operations of automated assistant 900, such as a mobile smartphone and a vehicle interface device both including an invocation engine (described below). In various implementations, the client computing device 902 may optionally operate one or more other applications that are in additional to automated assistant client 904, such as a message exchange client (e.g., SMS, MMS, online chat), a browser, and so forth. In some of those various implementations, one or more of the other applications can optionally interface (e.g. via an application programming interface) with the automated assistant 904, or include their own instance of an automated assistant application (that may also interface with the cloud-based automated assistant component(s) 910).

Automated assistant 900 engages in human-to-computer dialog sessions with a user via user interface input and output devices of the client device (not pictured). To preserve user privacy and/or to conserve resources, in many situations a user must often explicitly invoke the automated assistant 900 before the automated assistant will fully process a spoken utterance. The explicit invocation of the automated assistant 900 can occur in response to certain user interface input received at the client device 902. For example, user interface inputs that can invoke the automated assistant 900 via the client device 902 can optionally include actuations of a hardware and/or virtual button of the client device 902. Moreover, the automated assistant client can include one or more local engines 906, such as an invocation engine that is operable to detect the presence of one or more spoken invocation phrases. The invocation engine can invoke the automated assistant 900 in response to detection of one or more of the spoken invocation phrases. For example, the invocation engine can invoke the automated assistant 900 in response to detecting a spoken invocation phrase such as "Hey Assistant", "OK Assistant", and/or "Assistant". The invocation engine can continuously process (e.g., if not in an "inactive" mode) a stream of audio data frames that are based on output from one or more microphones of the client device 902, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 900. As used herein, "invoking" the automated assistant 900 can include causing one or more previously inactive functions of the automated assistant 900 to be activated. For example, invoking the automated assistant 900 can include causing one or more local engines 906 and/or cloud-based automated assistant components 910 to further process audio data frames based on which the invocation phrase was detected, and/or one or more following audio data frames (whereas prior to invoking no further processing of audio data frames was occurring).

The one or more local engine(s) 906 of automated assistant 904 can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), an ALM engine (such as APE engine 204 in FIG. 2), and/or other local components. Because the client device 902 is relatively constrained in terms of computing resources (e.g., processor cycles, memory, battery, etc.), the local engines 906 may have limited functionality relative to any counterparts that are included in cloud-based automated assistant components 910.

Cloud-based automated assistant components 910 leverage the virtually limitless resources of the cloud to perform more robust and/or more accurate processing of audio data, and/or other user interface input, relative to any counterparts of the local engine(s) 906. Again, in various implementations, the client device 902 can provide audio data and/or other data to the cloud-based automated assistant components 910 in response to the invocation engine detecting a spoken invocation phrase, or detecting some other explicit invocation of the automated assistant 900.

The illustrated cloud-based automated assistant components 910 include a cloud-based TTS module 912, a cloud-based STT module 914, and a natural language processor 916. In some implementations, one or more of the engines and/or modules of automated assistant 900 may be omitted, combined, and/or implemented in a component that is separate from automated assistant 900. Further, in some implementations automated assistant 900 can include additional and/or alternative engines and/or modules.

Cloud-based STT module 914 can convert audio data into text, which may then be provided to natural language processor 916. In various implementations, the cloud-based STT module 914 can convert audio data into text based at least in part on indications of speaker labels and assignments that are provided by an assignment engine (not illustrated).

Cloud-based TTS module 912 can convert textual data (e.g., natural language responses formulated by automated assistant 900) into computer-generated speech output. In some implementations, TTS module 912 may provide the computer-generated speech output to client device 902 to be output directly, e.g., using one or more speakers. In other implementations, textual data (e.g., natural language responses) generated by automated assistant 900 may be provided to one of the local engine(s) 906, which may then convert the textual data into computer-generated speech that is output locally.

Natural language processor 916 of automated assistant 900 processes free form natural language input and generates, based on the natural language input, annotated output for use by one or more other components of the automated assistant 900. For example, the natural language processor 916 can process natural language free-form input that is textual input that is a conversion, by STT module 914, of audio data provided by a user via client device 902. The generated annotated output may include one or more annotations of the natural language input and optionally one or more (e.g., all) of the terms of the natural language input. In some implementations, the natural language processor 916 is configured to identify and annotate various types of grammatical information in natural language input. For example, the natural language processor 916 may include a part of speech tagger (not depicted) configured to annotate terms with their grammatical roles. Also, for example, in some implementations the natural language processor 916 may additionally and/or alternatively include a dependency parser (not depicted) configured to determine syntactic relationships between terms in natural language input.

In some implementations, the natural language processor 916 may additionally and/or alternatively include an entity tagger (not depicted) configured to annotate entity references in one or more samples such as references to people (including, for instance, literary characters, celebrities, public figures, etc.), organizations, locations (real and imaginary), and so forth. The entity tagger of the natural language processor 916 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 916 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 916 may rely on annotations from one or more other components of the natural language processor 916. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 916 may use related prior input and/or other related data outside of the particular natural language input to determine one or more annotations.

Figure 10:
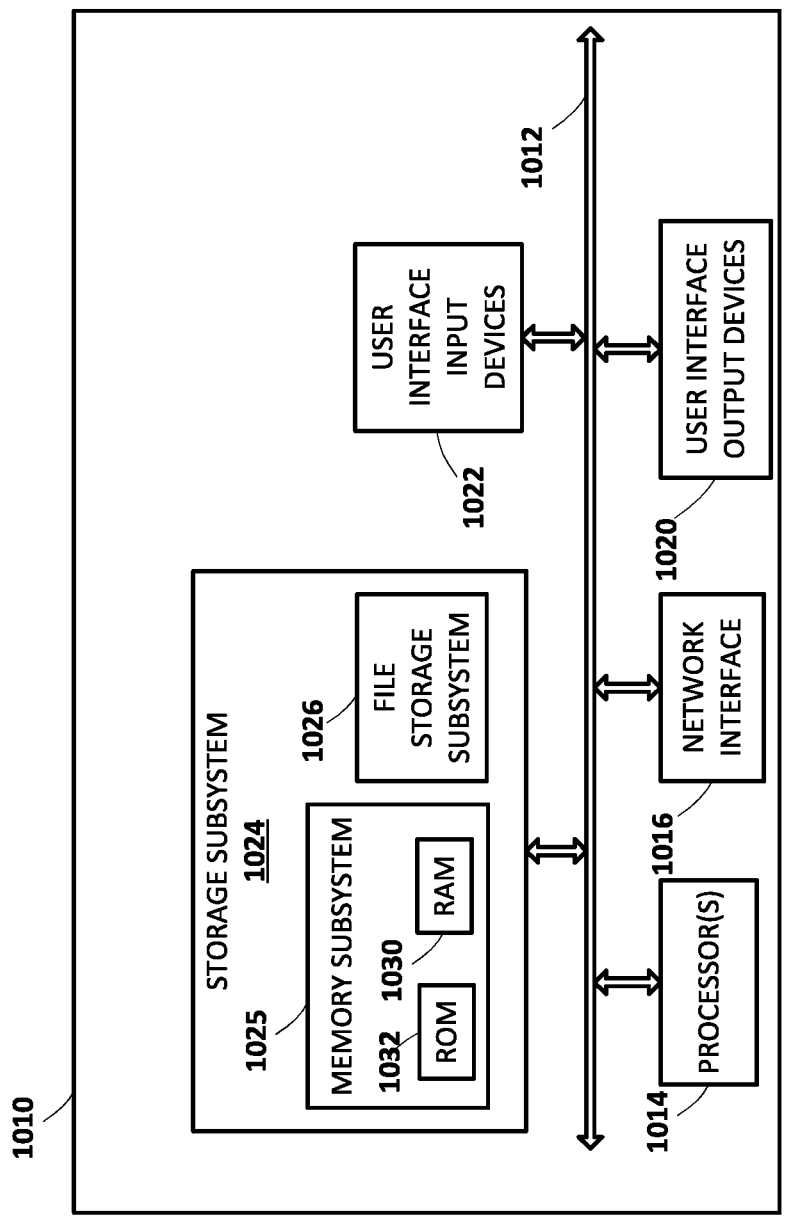
FIG. 10 illustrates an example architecture of a computing device.

FIG. 10 is a block diagram of an example computing device 1010 that may optionally be utilized to perform one or more aspects of techniques described herein. In some implementations, one or more of a client computing device, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of one or more of the processes of FIG. 6, FIG. 7, and/or FIG. 8, as well as to implement various components depicted in FIG. 2 and/or FIG. 9.

These software modules are generally executed by processor 1014 alone or in combination with other processors. Memory 1025 used in the storage subsystem 1024 can include a number of memories including a main random access memory ("RAM") 1030 for storage of instructions and data during program execution and a read only memory ("ROM") 1032 in which fixed instructions are stored. A file storage subsystem 1026 can provide persistent storage for programs and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In various implementations, a method implemented by one or more processors is is provided that includes receiving an instance of natural language text generated by processing a set of structured data using a natural language generation model. The method further includes processing the instance of natural language text and the set of structured data using an alignments and language model (ALM) to automatically generate an ALM score. Processing the instance of natural language text and the set of structured data using the ALM includes processing the instance of natural language text using a fluency model portion of the ALM to generate a fluency score, wherein the fluency score is an evaluation of the fluency and the grammar of the instance of natural language text. The method further includes processing the instance of natural language text and the set of structured data using a semantics model portion of the ALM to generate a semantics score, wherein the semantics score evaluates the content of the instance of natural language text based on the corresponding set of structured data. The method further includes determining the ALM score based on the fluency score and the semantics score. The method further includes causing a client device to perform one or more actions based on the instance of natural language text and based on the ALM score.

These and other implementations of the technology disclosed herein can include one or more of the following features.

In various implementations, causing the client device to perform the one or more actions based on the instance of natural language text and based on the ALM score includes determining whether the ALM score satisfies a threshold value. In various implementations, in response to determining the ALM score satisfies the threshold value, the method further includes generating an audio waveform based on the instance of natural language text. In various implementations, the method further includes causing the client device to render the audio waveform.

In various implementations, causing the client device to perform the one or more actions based on the instance of natural language text and based on the ALM score includes determining whether the ALM score satisfies a threshold value. In various implementations, in response to determining the ALM score satisfies the threshold value, the method further includes determining one or more device actions of a device associated with the client device. In various implementations, the method further includes causing the client device to perform the one or more device actions.

In various implementations, the fluency model portion of the ALM is an n-gram language model.

In various implementations, the fluency model portion of the ALM is trained using a training set of unlabeled training data, wherein the training set of unlabeled training data corresponds to a task of the natural language generation model. In some versions of those implementations, the semantics model portion of the ALM is trained using the training set of unlabeled training data. In some versions of those implementations, the the semantics model portion of the ALM is trained using the training set of unlabeled training data as well as structured data corresponding to each instance of unlabeled training data.

In various implementations, processing the instance of natural language text and the set of structured data using the semantics model portion of the ALM to generate the semantics score includes determining a conditional probability indicating a likelihood that the instance of natural language text was generated using the set of structured data. In various implementations, the method further includes determining an additional conditional probability indicating an additional likelihood that all information in the set of structured data is aligned with the instance of natural language text. In various implementations, the method further includes determining the semantics score based on the conditional probability and the additional conditional probability. In some versions of those implementations, determining the semantics score based on the conditional probability and the additional conditional probability includes determining the semantics score by weighing the conditional probability and the additional conditional probability using corresponding weights, for the conditional probability and the additional conditional probability, that are specific to a natural language generation task for which the instance of natural language text is generated.

In various implementations, determining the ALM score based on the fluency score and the semantics score includes determining the ALM score by weighing the fluency score and the semantics score.

In various implementations, the method further includes receiving a plurality of additional instances of natural language text that are based on the set of structured data, wherein each of the additional instances of natural language text is generated by processing the set of structured data using a corresponding distinct natural language generation model, of a plurality of disparate natural language generation models. In some versions of those implementations, the method further includes processing each of the plurality of additional instances of natural language text, using the ALM, to generate a plurality of corresponding ALM scores, each of the plurality of corresponding ALM scores generated based on processing a corresponding one of the instances of natural language text, and corresponding to the processed corresponding one of the instances of natural language text. In some versions of those implementations, causing the client device to perform the one or more actions based on the instance of natural language text and based on the ALM score further includes selecting the instance of natural language text, in lieu of any of the additional instances of natural language text, based on the ALM score for the instance of natural language of text and based on the corresponding ALM scores for the additional instances of natural language text. In some versions of those implementations, selecting the instance of natural language text, in lieu of any of the additional instances of natural language text, based on the ALM score for the instance of natural language of text and based on the corresponding ALM scores for the additional instances of natural language text, includes determining that the ALM score corresponding with the instance of natural language text satisfies a threshold value. In various implementations, in response to determining the ALM score corresponding with the instance of natural language text satisfies the threshold value, selecting the instance of natural language text. In some versions of those implementations, selecting the instance of natural language text, in lieu of any of the additional instances of natural language text, based on the ALM score for the instance of natural language of text and based on the corresponding ALM scores for the additional instances of natural language text, includes determining that the ALM score corresponding with the instance of natural language text is greater than the corresponding ALM scores for any of the additional instances of natural language text. In various implementations, the method further includes selecting the instance of natural language text based on determining that the ALM score corresponding with the instance of natural language text is greater than the corresponding ALM scores for any of the additional instances of natural language text.

In various implementations, a method implemented by one or more processors is provided that includes receiving a plurality of instances of natural language text based on a set of structured data, wherein each instance of natural language text is generated by processing the set of structured data using at least one natural language generation model. The method further includes processing the plurality of instances of natural language text using an alignments and language model (ALM) to automatically generate a plurality of corresponding ALM scores, wherein processing each instance of natural language text using the ALM includes processing the instance of natural language text using a fluency model portion of the ALM to generate a fluency score, wherein the fluency score is an evaluation of the fluency and the grammar of the instance of natural language text. The method further includes processing the instance of natural language text and the set of structured data using a semantics model portion of the ALM to generate a semantics score, wherein the semantics score evaluates the content of the instance of natural language text based on the corresponding set of structured data. The method further includes determining the corresponding ALM score based on the fluency score and the semantics score. The method further includes selecting one or more instances of natural language text from the plurality of instances of natural language text based on the corresponding ALM scores. For each of the one or more selected instances of natural language text, the method further includes determining a corresponding audio waveform based on the instance of natural language. The method further includes causing a client device to render output based on each of the corresponding audio waveforms corresponding to the one or more selected instances of natural language text.

In various implementations, a method implemented by one or more processors is provided that includes receiving a plurality of automatically generated training instances of unlabeled training data. For each instance of unlabeled training data, the method further includes processing the unlabeled training data using a fluency model portion of an alignments and language model (ALM) to update the fluency model portion of the ALM, wherein the ALM, when trained, is used in generating an ALM score by processing an instance of natural language text, wherein the fluency model portion of the ALM, when trained, is used in generating a fluency score by processing the instance of the natural language text, and wherein the fluency score is an evaluation of the fluency and the grammar of the instance of natural language text. The method further includes processing the unlabeled training data using a semantics model portion of the ALM to update the semantics model portion of the ALM, wherein the semantics model portion of the ALM, when trained, is used in generating a semantics score by processing the instance of the natural language text, wherein the semantics score is an evaluation of the content of the natural language text based on a corresponding set of structured data, and wherein the natural language text is generated by processing the set of structured data using a natural language generation model.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
    receiving an instance of natural language text generated by processing a set of structured data using a natural language generation model;
    processing the instance of natural language text and the set of structured data using an alignments and language model (ALM) to automatically generate an ALM score, wherein processing the instance of natural language text and the set of structured data using the ALM comprises:
        processing the instance of natural language text using a fluency model portion of the ALM to generate a fluency score, wherein the fluency score is an evaluation of the fluency and the grammar of the instance of natural language text;
        processing the instance of natural language text and the set of structured data using a semantics model portion of the ALM to generate a semantics score, wherein the semantics score evaluates the content of the instance of natural language text based on the corresponding set of structured data;
        determining the ALM score based on the fluency score and the semantics score;
    causing a client device to perform one or more actions based on the instance of natural language text and based on the ALM score; and
    receiving a plurality of additional instances of natural language text that are based on the set of structured data, wherein each of the additional instances of natural language text is generated by processing the set of structured data using a corresponding distinct natural language generation model, of a plurality of disparate natural language generation models.

2. The method of claim 1, wherein causing the client device to perform the one or more actions based on the instance of natural language text and based on the ALM score comprises:
    determining whether the ALM score satisfies a threshold value;
    in response to determining the ALM score satisfies the threshold value,
        generating an audio waveform based on the instance of natural language text; and
        causing the client device to render the audio waveform.

3. The method of claim 1, wherein the fluency model portion of the ALM is an n-gram language model.

4. The method of claim 1, wherein the fluency model portion of the ALM is trained using a training set of unlabeled training data, wherein the training set of unlabeled training data corresponds to a task of the natural language generation model.

5. The method of claim 4, wherein the semantics model portion of the ALM is trained using the training set of unlabeled training data.

6. The method of claim 5, wherein the semantics model portion of the ALM is trained using the training set of unlabeled training data as well as structured data corresponding to each instance of unlabeled training data.

7. The method of claim 1, wherein processing the instance of natural language text and the set of structured data using the semantics model portion of the ALM to generate the semantics score comprises:
    determining a conditional probability indicating a likelihood that the instance of natural language text was generated using the set of structured data;

determining an additional conditional probability indicating an additional likelihood that all information in the set of structured data is aligned with the instance of natural language text; and determining the semantics score based on the conditional probability and the additional conditional probability.

8. The method of claim 7, wherein determining the semantics score based on the conditional probability and the additional conditional probability comprises:

determining the semantics score by weighing the conditional probability and the additional conditional probability using corresponding weights, for the conditional probability and the additional conditional probability, that are specific to a natural language generation task for which the instance of natural language text is generated.

9. The method of claim 1, wherein determining the ALM score based on the fluency score and the semantics score comprises:

determining the ALM score by weighing the fluency score and the semantics score.

10. The method of claim 1, further comprising:

processing each of the plurality of additional instances of natural language text, using the ALM, to generate a plurality of corresponding ALM scores, each of the plurality of corresponding ALM scores generated based on processing a corresponding one of the instances of natural language text, and corresponding to the processed corresponding one of the instances of natural language text.

11. The method of claim 10, wherein causing the client device to perform the one or more actions based on the instance of natural language text and based on the ALM score further comprises:

selecting the instance of natural language text, in lieu of any of the additional instances of natural language text, based on the ALM score for the instance of natural language of text and based on the corresponding ALM scores for the additional instances of natural language text.

12. The method of claim 11, wherein selecting the instance of natural language text, in lieu of any of the additional instances of natural language text, based on the ALM score for the instance of natural language of text and based on the corresponding ALM scores for the additional instances of natural language text, comprises:

determining that the ALM score corresponding with the instance of natural language text satisfies a threshold value; and in response to determining the ALM score corresponding with the instance of natural language text satisfies the threshold value, selecting the instance of natural language text.

13. The method of claim 11, wherein selecting the instance of natural language text, in lieu of any of the additional instances of natural language text, based on the ALM score for the instance of natural language of text and based on the corresponding ALM scores for the additional instances of natural language text, comprises:

determining that the ALM score corresponding with the instance of natural language text is greater than the corresponding ALM scores for any of the additional instances of natural language text; and selecting the instance of natural language text based on determining that the ALM score corresponding with the instance of natural language text is greater than the corresponding ALM scores for any of the additional instances of natural language text.

14. A method implemented by one or more processors, the method comprising:

receiving a plurality of instances of natural language text based on a set of structured data, wherein each instance of natural language text is generated by processing the set of structured data using at least one natural language generation model;

processing the plurality of instances of natural language text using an alignments and language model (ALM) to automatically generate a plurality of corresponding ALM scores, wherein processing each instance of natural language text using the ALM comprises:

processing the instance of natural language text using a fluency model portion of the ALM to generate a fluency score, wherein the fluency score is an evaluation of the fluency and the grammar of the instance of natural language text;

processing the instance of natural language text and the set of structured data using a semantics model portion of the ALM to generate a semantics score, wherein the semantics score evaluates the content of the instance of natural language text based on the corresponding set of structured data;

determining the corresponding ALM score based on the fluency score and the semantics score;

selecting one or more instances of natural language text from the plurality of instances of natural language text based on the corresponding ALM scores;

for each of the one or more selected instances of natural language text, determining a corresponding audio waveform based on the instance of natural language text; and causing a client device to render output based on each of the corresponding audio waveforms corresponding to the one or more selected instances of natural language text.

15. The method of claim 14, wherein the fluency model portion of the ALM is an n-gram language model.

16. The method of claim 14, wherein the fluency model portion of the ALM is trained using a training set of unlabeled training data, wherein the training set of unlabeled training data corresponds to a task of the natural language generation model.

17. The method of claim 16, wherein the semantics model portion of the ALM is trained using the training set of unlabeled training data.

18. The method of claim 14, wherein determining the corresponding ALM score based on the fluency score and the semantics score comprises:

determining the corresponding ALM score by weighing the fluency score and the semantics score.

19. The method of claim 14, wherein processing the instance of natural language text and the set of structured data using the semantics model portion of the ALM to generate the semantics score comprises:

determining a conditional probability indicating a likelihood that the instance of natural language text was generated using the set of structured data;

determining an additional conditional probability indicating an additional likelihood that all information in the set of structured data is aligned with the instance of natural language text; and determining the semantics score based on the conditional probability and the additional conditional probability.

20. A system comprising:
memory storing instructions;
one or more processors that execute the instructions, stored in the memory, to:
- receive a plurality of instances of natural language text based on a set of structured data, wherein each instance of natural language text is generated by processing the set of structured data using at least one natural language generation model;
- process the plurality of instances of natural language text using an alignments and language model (ALM) to automatically generate a plurality of corresponding ALM scores, wherein processing each instance of natural language text using the ALM comprises:
  - process the instance of natural language text using a fluency model portion of the ALM to generate a fluency score, wherein the fluency score is an evaluation of the fluency and the grammar of the instance of natural language text;
  - process the instance of natural language text and the set of structured data using a semantics model portion of the ALM to generate a semantics score, wherein the semantics score evaluates the content of the instance of natural language text based on the corresponding set of structured data;
  - determine the corresponding ALM score based on the fluency score and the semantics score;
- select one or more instances of natural language text from the plurality of instances of natural language text based on the corresponding ALM scores;
- for each of the one or more selected instances of natural language text, determine a corresponding audio waveform based on the instance of natural language text; and
- cause a client device to render output based on each of the corresponding audio waveforms corresponding to the one or more selected instances of natural language text.

* * * * *